A. M. Blake,

Spring Chair.

No. 3385. Reissued Apr. 20. 1869.

W. B. Langdon Jr.
D. H. Ammond.
} WITNESSES.

A. Milton Blake INVENTOR.
BY Job Abbott ATTORNEY.

United States Patent Office.

A. MILTON BLAKE, OF CANTON, OHIO.

*Letters Patent No.* 77,161, *dated April* 28, 1868; *reissue No.* 3,385, *dated April* 20, 1869.

IMPROVED SPRING-CHAIR.

The Schedule referred to in these Letters Patent and making part of the same.

*To all whom it may concern:*

Be it known that I, A. MILTON BLAKE, of Canton, in the county of Stark, and State of Ohio, have invented certain new and useful Improvements in Springs for Chairs; and I do hereby declare that the following is a full, clear, and exact description of my invention, reference being had to the accompanying drawings, forming a part of this specification, and to the letters of reference marked thereon, of which drawings—

The nature of my invention consists in the use of a conical spiral spring under the front or the rear legs of a chair, settee, sofa, or any seat of like character, whereby I convert a common chair, or like seat, into a chair, or seat having all the advantages of a rocking-chair, and which rocks quite as easy as any rocking-chair, the peculiar utility of the conical form of the spiral spring, in this connection, consisting in the fact, that when said spring is compressed, the several coils lie side by side, instead of lying one on the top of the other, as in the case of a compressed cylindrical spiral spring, which allows the chair a rocking-motion equal to the whole height of the spring, instead of a motion only equal to the sum of the distances between the different coils, as in the case of the use of the cylindrical spiral spring, which is an important advantage, as it enables me to obtain all the requisite rocking-motion without the necessity of very high springs, which are very objectionable, both on account of their greater cost, and also on account of their throwing the chair so far back as to be in danger of upsetting when unoccupied.

To enable others skilled in the art to make and use my invention, I will proceed to describe its construction and operation.

The body of the chair, to which my springs are to be applied, is represented at A, and is supported on legs, B B, C C, which are united by cross-pieces, as shown.

The rear legs B B rest on the floor, and the front legs C C, which are made somewhat shorter than the hind legs, rest on the tops of the springs F F, which are of the conical spiral form shown, and are constructed of round, square, polygonal, flat, or any desired cross-section, of steel, or other like suitable material.

Figure 1:
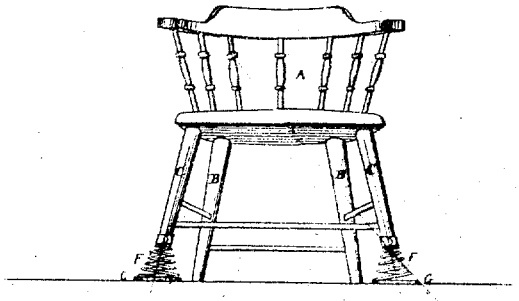
Figure 1 is a front elevation of a chair with my improved spring applied thereto.
Figure 2:
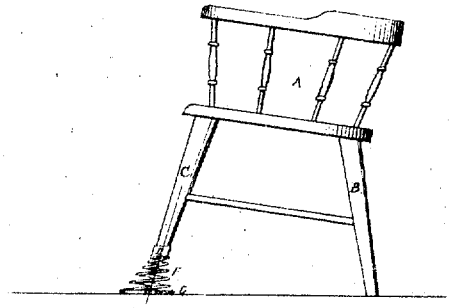
Figure 2 is a side elevation of the same.
Figure 3:
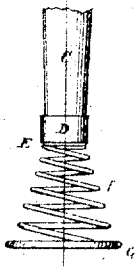
Figures 3 and 4 are detail views, showing the manner of securing the spring to the chair-legs.

The mode of attaching the springs F to the legs C may be like that shown in fig. 3, where D represents a socket, or cup, with bottom plate E, which receives the end of the leg C, and to which the spring F may be secured in any suitable manner.

Figure 4:
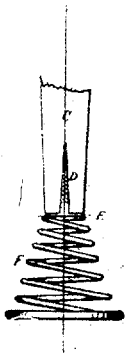

Another mode of attachment is shown in fig. 4, where D is a screw-threaded spindle, which is screwed into a hole in the leg C, and E is a base-plate, which is secured to the spindle D, and to which the spring F is attached, as shown.

The socket, or spindle B can be cast with or soldered to the bottom, or base-plate E, and the spring F may be cast with or soldered to the socket D, or plate E, or may be attached in any other suitable manner.

Figure 5:
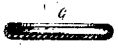
Figure 5 is a sectional view, showing mode of constructing foot-plate.

The bottoms of the springs F F can rest directly on the floor, or a plate, G, may be used, which is provided with flanges, as shown in fig. 5, and is secured to the spring F by bending the lower coil of said spring into a circular form, and springing said coil under said plate-flanges, in an obvious manner.

Having thus fully described my invention,

What I claim as new, and desire to secure by Letters Patent, is—

1. The combination of the chair-leg C, socket or spindle D E, and conical spiral spring F, the several parts being arranged substantially as and for the purpose herein specified.

2. The combination of the chair-leg C, socket, or spindle D E, conical spiral spring F, and foot-plate G, the several parts being arranged substantially as and for the purpose specified.

As evidence that I claim the foregoing, I have hereunto set my hand, in presence of two witnesses, this 18th day of February, A. D. 1869.

A. MILTON BLAKE.

Witnesses:

JOB ABBOTT,

WM. B. BLAKE.